United States Patent
Grimshaw et al.

(10) Patent No.: US 7,868,276 B2
(45) Date of Patent: Jan. 11, 2011

(54) AIRBORNE VEHICLE EMULATION SYSTEM AND METHOD

(75) Inventors: Stephen B. Grimshaw, Orlando, FL (US); Frank B. Butler, Mineral Bluff, GA (US)

(73) Assignee: Lockheed Martin Corporation, Bethesda, MD (US)

( * ) Notice: Subject to any disclaimer, the term of this patent is extended or adjusted under 35 U.S.C. 154(b) by 38 days.

(21) Appl. No.: 11/976,454

(22) Filed: Oct. 24, 2007

(65) Prior Publication Data

US 2009/0109063 A1 Apr. 30, 2009

(51) Int. Cl.
- G06F 19/00 (2006.01)
- F41G 9/00 (2006.01)
- F42B 15/01 (2006.01)
- F41G 7/00 (2006.01)
- F42B 15/00 (2006.01)

(52) U.S. Cl. .......... 244/3.1; 244/3.15; 89/1.11; 235/400; 703/23

(58) Field of Classification Search .......... 235/400, 235/401–418; 244/3.1–3.3, 1 R, 4 R, 117 R, 244/118.1, 118.2, 129.1, 137.1; 89/1.11, 89/1.8, 1.814, 1.815, 1.819, 1.56, 1.813, 89/37.01, 37.16–37.22; 700/1, 9, 10; 342/61–65; 102/374, 377–379, 501; 701/1–3, 14; 710/1, 710/62–74, 100, 105, 106; 703/23–28

See application file for complete search history.

(56) References Cited

U.S. PATENT DOCUMENTS

| | | | |
|---|---|---|---|
| 3,088,373 A | 5/1963 | Robert et al. | |
| 3,504,593 A | 4/1970 | Ricks et al. | |
| 3,609,312 A * | 9/1971 | Higgins et al. | 700/10 |
| 3,659,493 A | 5/1972 | Wissner | |
| 3,779,129 A * | 12/1973 | Lauro | 89/1.56 |
| 4,429,611 A | 2/1984 | Oldham et al. | |
| 4,494,438 A * | 1/1985 | Lighton et al. | 89/1.813 |
| 4,697,764 A | 10/1987 | Hardy et al. | |
| 5,034,686 A * | 7/1991 | Aspelin | 89/1.819 |
| 5,036,466 A * | 7/1991 | Fitzgerald et al. | 235/400 |
| 5,148,734 A * | 9/1992 | Lilly | 89/1.815 |
| 5,214,584 A * | 5/1993 | Dingee et al. | 244/3.11 |
| 5,229,538 A * | 7/1993 | McGlynn et al. | 89/1.56 |
| 5,377,109 A * | 12/1994 | Baker et al. | 701/14 |
| 5,541,839 A | 7/1996 | Mitzkus et al. | |
| 5,548,510 A * | 8/1996 | Ebert et al. | 701/3 |
| 5,742,609 A | 4/1998 | Kondrak et al. | |
| 5,983,771 A | 11/1999 | Lehr | |

(Continued)

OTHER PUBLICATIONS

Extended European Search Report dated Sep. 7, 2010 issued in European Application No. 08165141.6.

Primary Examiner—Bernarr E Gregory
(74) Attorney, Agent, or Firm—Buchanan Ingersoll & Rooney PC

(57) ABSTRACT

An apparatus includes a first interface configured to communicate via a first protocol, and a first holding device configured to hold an airborne vehicle. The first holding device includes a second interface configured to communicate with the first interface via the first protocol, and to communicate with the airborne vehicle via a second protocol. The apparatus includes an emulator configured to convert at least one of a communication of the first protocol into a communication of the second protocol, and a communication of the second protocol into a communication of the first protocol.

25 Claims, 7 Drawing Sheets

U.S. PATENT DOCUMENTS

| | | | |
|---|---|---|---|
| 5,992,290 A * | 11/1999 | Quebedeaux et al. | 89/1.56 |
| 6,012,375 A | 1/2000 | Eckstein | |
| 6,122,569 A * | 9/2000 | Ebert et al. | 701/3 |
| 6,330,866 B1 | 12/2001 | Cipolla | |
| 6,349,898 B1 * | 2/2002 | Leonard et al. | 244/3.15 |
| 6,360,290 B1 * | 3/2002 | Avritch et al. | 710/105 |
| 6,382,072 B1 | 5/2002 | Cipolla | |
| 6,584,882 B2 | 7/2003 | Briggs et al. | |
| 6,615,116 B2 * | 9/2003 | Ebert et al. | 701/3 |
| 6,718,409 B2 * | 4/2004 | Houlberg | 710/62 |
| 6,755,372 B2 * | 6/2004 | Menzel et al. | 244/3.15 |
| 6,763,289 B2 * | 7/2004 | Leonard et al. | 701/3 |
| 6,941,850 B1 * | 9/2005 | McMahon | 89/1.56 |
| 7,013,788 B1 | 3/2006 | Williams et al. | |
| 7,137,599 B1 * | 11/2006 | Sitzmann et al. | 244/3.1 |
| 7,353,090 B2 * | 4/2008 | Leonard et al. | 701/3 |
| 7,487,014 B1 * | 2/2009 | Houlberg | 701/3 |
| 7,487,015 B1 * | 2/2009 | Houlbert | 701/3 |
| 2004/0205285 A1 | 10/2004 | Kinstler | |

* cited by examiner

_US 7,868,276 B2_

AIRBORNE VEHICLE EMULATION SYSTEM AND METHOD

BACKGROUND

Military platforms may have lifecycles extending over dozens of years. Over the platform's lifecycle, it may be desirable to adapt the platform to operate with new systems.

However, the investment to engineer, test and certify the new system may make adoption impractical. For example, integrating a new missile system into an existing, certified aircraft platform can involve new software to control the missile system, new hardware to mount the missile system to the aircraft, and new interfaces to exchange information with the missile system. In addition, new tests may need to be conducted to ensure operability of the system and certify it for use in the field.

SUMMARY

An exemplary apparatus disclosed herein includes a first interface configured to communicate via a first protocol. The apparatus includes a first holding device configured to hold an airborne vehicle. The first holding device includes a second interface configured to communicate with the first interface via the first protocol, and to communicate with the airborne vehicle via a second protocol. The apparatus includes an emulator configured to convert at least one of a communication of the first protocol into a communication of the second protocol, and a communication of the second protocol into a communication of the first protocol.

An exemplary emulator disclosed herein comprises a receiving unit configured to receive a first communication of a first protocol for operating an airborne vehicle, which operates in accordance with a communication of a second protocol, and to receive a second communication of the second protocol from the airborne vehicle. The emulator comprises a conversion unit configured to convert at least one of the received first communication of the first protocol into the second communication of the second protocol, and the received second communication of the second protocol into the first communication of the first protocol. In addition, the emulator comprises an output unit configured to output the at least one of the converted second communication of the second protocol to the airborne vehicle for operating the airborne vehicle, and the converted first communication of the first protocol to an interface enabling an operator to control an operation of the airborne vehicle.

An exemplary airborne vehicle holding device is provided for holding and launching a first airborne vehicle of a first type. The airborne vehicle holding device comprises a first interface configured to communicate with a second interface via a first protocol to receive a communication of the first protocol for operating the first airborne vehicle, which operates in accordance with a communication of a second protocol. The airborne vehicle holding device comprises a canister configured to hold the first airborne vehicle. The canister is adaptively structured to be mounted to a platform configured to launch a second airborne vehicle of a second type. In addition, the airborne vehicle holding device comprises an emulator configured to convert at least one of the received communication of the first protocol into a communication of the second protocol for operating the first airborne vehicle via the second protocol, and a communication of the second protocol received from the first airborne vehicle into a communication of the first protocol to be outputted to the first interface via the first protocol.

An exemplary weapons system comprises first interface means for communicating via a first protocol, and first holding means for holding an airborne vehicle. The weapons system comprises second interface means for communicating with the first interface means via the first protocol, and communicating with the airborne vehicle via a second protocol. The weapons system comprises conversion means for converting at least one of a communication of the first protocol into a communication of the second protocol, and a communication of the second protocol into a communication of the first protocol.

An exemplary method for emulating an airborne vehicle comprises transmitting a communication of a first protocol to a holding device holding an airborne vehicle, which operates in accordance with a communication of a second protocol. The method comprises converting the communication of the first protocol transmitted to the holding device into a communication of the second protocol, and transmitting the converted communication of the second protocol to the airborne vehicle to operate the airborne vehicle.

BRIEF DESCRIPTION OF THE DRAWINGS

Other objects and advantages of the invention will become apparent to those skilled in the art upon reading the following detailed description of exemplary embodiments, in conjunction with the accompanying drawings, in which like reference numerals have been used to designate like elements, and in which.

DETAILED DESCRIPTION

Figure 1:
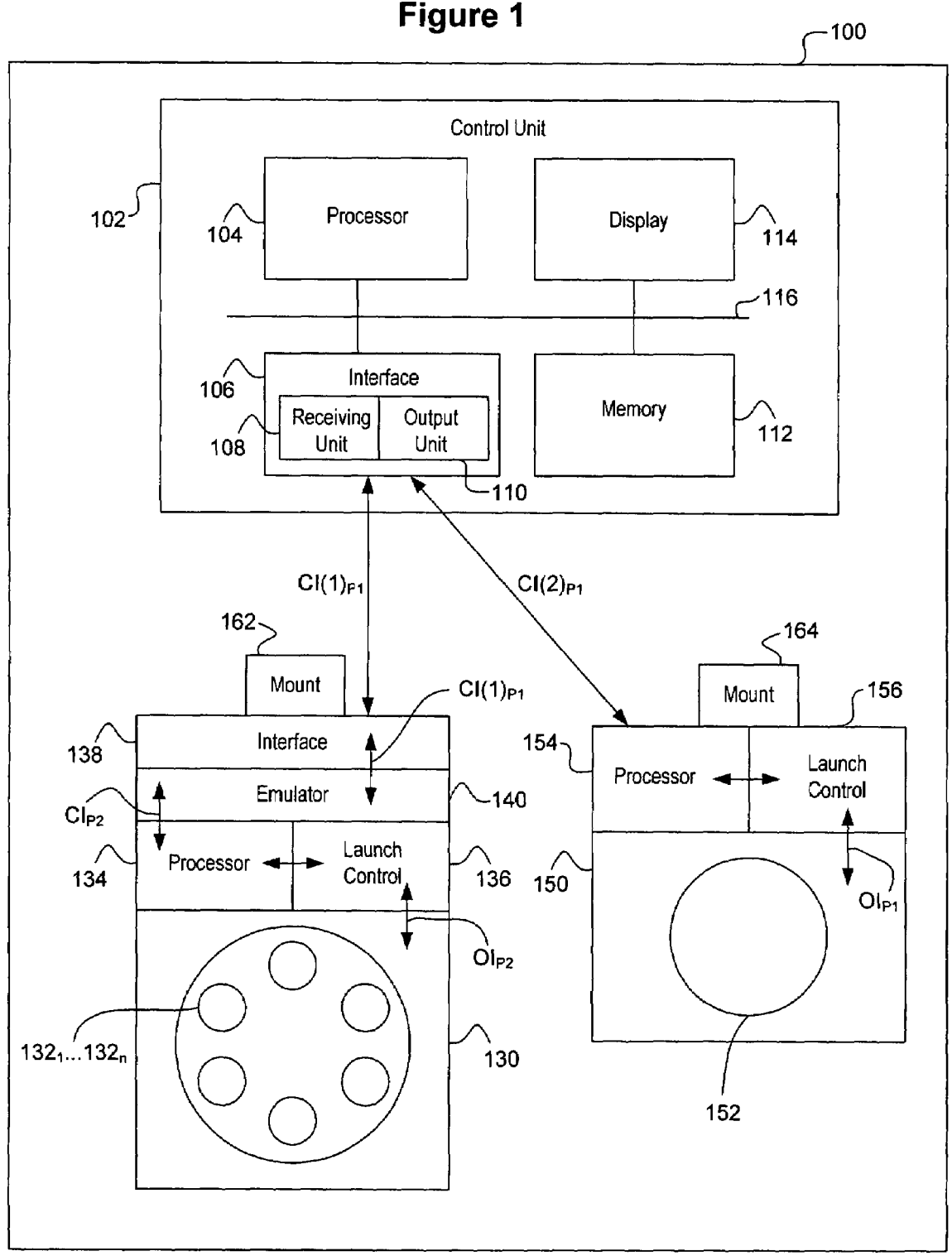
FIG. 1 is a block diagram illustrating an exemplary apparatus consistent with embodiments disclosed herein.

FIG. 1 is a block diagram illustrating an exemplary apparatus 100, consistent with at least one embodiment of the invention. Exemplary apparatus 100 can include an interface 106 configured to communicate via a first protocol P1. As used herein, the term "interface" means an electronic device or circuit configured to communicate with another device or a plurality of other devices. In addition, an "interface" also encompasses an electronic device or circuit which serves as the point of communicative interaction between two or more devices. As used herein, the term "protocol" means a characteristic of communication relating to a format of data transmission between two or more devices.

Exemplary apparatus 100 can also include a holding device 130 configured to hold an airborne vehicle, such as one or more of the plurality of airborne vehicles $132_1 \ldots 132_n$ ($1 < n < \infty$) illustrated in FIG. 1. The plurality of airborne vehicles $132_1 \ldots 132_n$ may hereinafter be collectively referred to as an airborne vehicle 132 or as at least one airborne vehicle 132, unless otherwise noted. As shown in FIG. 1, the holding device 130 can include an interface 138 configured to communicate with the interface 106 via the first protocol P1, and to communicate with the at least one airborne vehicle 132 via a second protocol P2.

Exemplary apparatus 100 can also include an emulator 140 configured to convert a communication of the first protocol P1 into a communication of the second protocol P2, and/or convert a communication of the second protocol P2 into a communication of the first protocol P1.

The plurality of airborne vehicles $132_1 \ldots 132_n$ operate according to a communication of the second protocol P2. As described above, the interface 106 communicates via the first protocol P1, and the interface 138 of the holding device 130 communicates with the interface 106 via the first protocol P1. Consequently, any communication of the first protocol P1 received by the interface 138 from the interface 106 may not properly operate one or more of the plurality of airborne vehicles $132_1 \ldots 132_n$, since the plurality of airborne vehicles $132_1 \ldots 132_n$ operate according to a communication of the second protocol P2. Similarly, any communication of the second protocol P2 received by the interface 138 from one or more of the plurality of airborne vehicles $132_1 \ldots 132_n$ may not be properly functional or operable with the interfaces 106 and 138, since the interfaces 106 and 138 communicate via the first protocol P1.

Therefore, the emulator 140 can convert a communication of the first protocol P1 received by the interface 138 into a communication of the second protocol P2, and output the converted communication of the second protocol P2 to one or more of the plurality of airborne vehicles $132_1 \ldots 132_n$ to operate one or more of the plurality of airborne vehicles $132_1 \ldots 132_n$. In addition, the emulator 140 can also convert a communication of the second protocol P2 received from one or more of the plurality of airborne vehicles $132_1 \ldots 132_n$ into a communication of the first protocol P1 to be output to the interface 106 via the interface 138. The communication and conversion functions of the emulator 140 will be further described below.

The plurality of airborne vehicles $132_1 \ldots 132_n$ are a first type of airborne vehicle. The interface 106 can also be configured to communicate with an airborne vehicle of a second type, such as the airborne vehicle 152 illustrated in FIG. 1, via the first protocol P1. The airborne vehicle 152 operates according to a communication of the first protocol P1. The exemplary apparatus 100 can therefore also include a holding device 150 configured to hold the airborne vehicle 152. To facilitate understanding how the exemplary apparatus 100 is compatible with two different types of airborne vehicles operating according to two different protocols, the example of FIG. 1 illustrates that the exemplary apparatus 100 can also include the holding device 150 configured to hold an airborne vehicle of a second type, such as the airborne vehicle 152. It is to be understood, however, that the exemplary apparatus 100 does not need to be equipped with the holding device 150 and the airborne vehicle of the second type 152 in order to operate one or more of the plurality of airborne vehicles $132_1 \ldots 132_n$ via the second protocol P2.

The plurality of airborne vehicles $132_1 \ldots 132_n$ are a different type of airborne vehicle than the airborne vehicle 152 because the plurality of airborne vehicles $132_1 \ldots 132_n$ operate according to the second protocol P2, whereas the airborne vehicle 152 operates according to the first protocol P1. Accordingly, as described herein, an airborne vehicle can be considered to be a different type than another airborne vehicle if the airborne vehicle operates according to a communication of a different protocol than the other airborne vehicle.

The airborne vehicles $132_1 \ldots 132_n$ will hereinafter be collectively described as airborne vehicles of a first type 132 or as a first airborne vehicle 132, unless otherwise noted. Similarly, the airborne vehicle 152 will hereinafter be described as an airborne vehicle of a second type 152 or as a second airborne vehicle 152, unless otherwise noted.

The second airborne vehicle 152 can be, for example, a HELLFIRE® guided missile. The HELLFIRE® missile is a laser guided missile that was designed to be used as an offensive weapon against fortified targets such as tanks and other armored vehicles. Since the original design and production of the HELLFIRE® I missile in 1972 and the HELLFIRE® II missile in 1990, several variations of the HELLFIRE® missile have been developed for various functions. References herein to a HELLFIRE® missile are intended to encompass all existing and future developed variations of the HELLFIRE® missile. The HELLFIRE® missile is an air-to-ground and surface-to-surface missile. HELLFIRE® missiles can be laser-guided by homing in on a reflected laser energy beam aimed at a target from a launching platform. The projection of the laser energy beam aimed at the target can originate from a ground observer, a vehicle from which the HELLFIRE® missile is to be launched, another vehicle, or a stationary launching platform. HELLFIRE® missiles can alternatively be radar-guided. In particular, a variation of the HELLFIRE® missile called the LONGBOW® HELLFIRE® uses a radar frequency seeker to be guided toward a target.

HELLFIRE® missiles are designed to be launched from launchers dedicated to the HELLFIRE® missiles, such as the M299 launcher developed by Lockheed Martin, for example. Hereinafter, the term "HELLFIRE® launcher" encompasses all launchers which are designed to launch a HELLFIRE® missile from any type of mobile vehicle platform or stationary launching platform. A HELLFIRE® launcher provides the electronic and mechanical interface between the HELLFIRE® missile and the vehicle or platform operating the HELLFIRE® missile. The holding device 150 illustrated in the example of FIG. 1 can be a HELLFIRE® launcher equipped in the exemplary apparatus 100.

Military forces have used a Hydra-70 rocket system (hereinafter, "Hydra-70 rocket") as a free-flight aerial rocket for air-to-ground, ground-to-air, and surface-to-surface combat. The Hydra-70 rocket is a 2.75 inch (70 mm) rocket which has been used for providing close air support to ground forces and can be launched from several different launching platforms, such as the M260 or M261 rocket launcher, for example. Hereinafter, the term "Hydra-70 rocket launcher" encompasses all launchers which are designed to launch a Hydra-70 rocket from any type of mobile vehicle or stationary launching platform. The Hydra-70 rocket can be launched from aerial, land-based and naval-based vehicles.

The dimensions and warhead of the Hydra-70 rocket are smaller than those of the HELLFIRE® missile. The Hydra-70 rocket is considered to be a "point-and-shoot" rocket. As a result, a vehicle launching the Hydra-70 rocket may need to move closer to a hostile target than if the vehicle was launching a HELLFIRE® missile.

The advanced precision weapon kill system (APKWS or APKWS II, hereinafter collectively referred to as "APKWS") is a modification of the existing Hydra-70 rocket, in that the existing Hydra-70 rocket is equipped with a laser sensor and guidance package to launch the Hydra-70 rocket onto a target. Otherwise, the APKWS is similar to the existing Hydra-70 rocket in that the APKWS uses the existing Hydra-70 rocket launchers, i.e., the canister for holding and launching the guidance-modified Hydra-70 rockets.

The Direct Attack Guided Rocket (DAGR™) weapons system modifies the existing Hydra-70 rockets to be equipped with a laser homing guidance system, while using the existing Hydra-70 rocket launchers, such as the M260 or M261 canisters, to launch the DAGR™ weapons. The DAGR™ weapons can provide full HELLFIRE® functionality, including lock-on-before-launch, lock-on-after-launch, target location handoff, enhanced built-in tests, programmable laser coding, and flexible fly-out modules.

The Low-Cost Guided Imaging Rocket (LOGIR) is a precision guided Hydra-70 rocket using the existing Hydra-70 rocket launchers.

According to an exemplary embodiment, the first airborne vehicle 132 can be, for example, a laser guided rocket, such as the APKWS, DAGR™ and LOGIR weapons. The holding device 130 can be, for example, a Hydra-70 rocket launcher canister for holding and launching such a laser guided rocket. It is to be understood that the exemplary embodiments disclosed herein are not limited to the representative examples of the holding device 130, the plurality of airborne vehicles $132_1 \ldots 132_n$, the holding device 150, and the airborne vehicle 152 described above.

The exemplary apparatus 100 can include a control unit 102 configured to communicate with the interface 138 and an operator of the exemplary apparatus 100 via the first protocol P1. As illustrated in FIG. 1, the control unit 102 can include a processor 104, the interface 106, a memory 112, and a display 114. The processor 104, the interface 106, the memory 112 and the display 114 can be configured to communicate with each other by a common communication medium 116, such as a bus, for example.

The control unit 102 controls the functions and operations of the exemplary apparatus 100. The processor 104 controls the aggregate functions of each component of the control unit 102, as well as the interrelationship and interaction between the components of the control unit 102. The processor 104 can include a CPU (central processing unit) for performing the functions of the processor 104. The memory 112 can include a ROM (read-only memory) and RAM (random-access memory). The ROM of the memory 112 stores programs and logic instructions which are implemented by the processor 104, and the RAM of the memory 112 is used a working memory by the processor 104 when executing the programs and logic instructions stored in the ROM. The memory 112 can also include writable memory to store configuration information for operating an airborne vehicle equipped in the exemplary apparatus 100, such as the first airborne vehicle 132 and the second airborne vehicle 152.

The display 114 of the control unit 102 can display configuration information to an operator of the exemplary apparatus 100 for operating the first airborne vehicle 132 and the second airborne vehicle 152. As used herein, "configuration information" includes instructions and parameters for operating an airborne vehicle, such as the first airborne vehicle 132 and the second airborne vehicle 152. The display 114 can also display and/or reproduce audio/video, telephonic, radio, radar or infrared communications between an operator of the apparatus 100 and an individual or computing device outside the apparatus 100. As used herein, the "operator" of the exemplary apparatus 100 encompasses a human operator as well as a non-human computing device, such as an unmanned aerial vehicle (UAV), for example. In addition, the display 114 can also display navigation and/or guidance information (e.g., coordinates information), and vehicle parameter information (e.g., speed, RPMs, fuel levels, battery power levels, oil pressure, etc.).

As shown in FIG. 1, the interface 106 can include a receiving unit 108 and an output unit 110 configured to communicate with the interface 138 of the holding device 130. The receiving unit 108 is configured to receive first configuration information $CI(1)_{P1}$ of the first airborne vehicle 132 via the first protocol P1. The output unit 110 is configured to output the received first configuration information $CI(1)_{P1}$ to the interface 138 and/or the display 114. As used herein, the parenthetical numeral (1) in the reference numeral "$CI(1)_{P1}$" represents first configuration information CI, and the subscript $_{P1}$ represents that the configuration information CI is of the first protocol P1. Similarly, a parenthetical numeral (2) ... (n) will respectively represent second to nth configuration information CI, and a subscript $_{P2 \ldots Pn}$ in the designation of the configuration information CI will represent that the configuration information CI is of a second to nth protocol P2 ... Pn.

The exemplary apparatus 100 can be an aircraft (aerial vehicle), land-based vehicle and/or naval-based vehicle. As used herein, an "aircraft" encompasses an aerial vehicle flown by a human operator, or an aerial vehicle autonomously operated by a computing device, such as the above-described UAV. The first configuration information $CI(1)_{P1}$ of the first protocol P1 can include instructions and parameters for operating the first airborne vehicle 132. The receiving unit 108 can be configured to receive the first configuration information $CI(1)_{P1}$ from the operator of the apparatus 100 via the first protocol P1. For example, the receiving unit 108 can be configured to receive one or more of a power on/off instruction, a test instruction, a coordinates instruction and a launch instruction as the first configuration information $CI(1)_{P1}$ of the first airborne vehicle 132 via the first protocol P1 from the operator of the exemplary apparatus 100. The output unit 110 can be configured to output the received first configuration information $CI(1)_{P1}$ of the first airborne vehicle 132 to the interface 138 via the first protocol P1.

Figure 2:
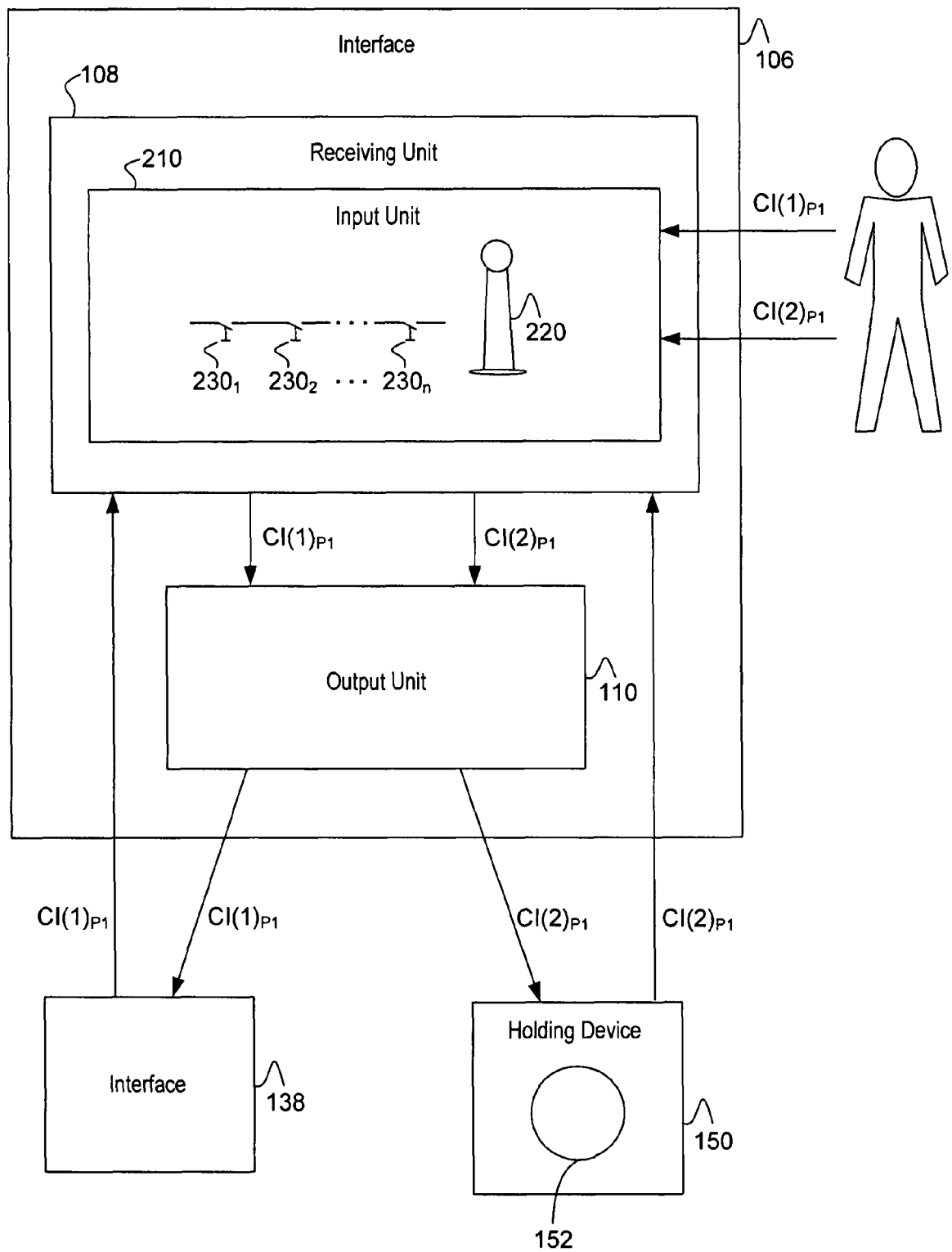
FIG. 2 is a block diagram illustrating components of an interface of the exemplary apparatus.

FIG. 2 is a block diagram illustrating components of the interface 106 and their communicative functions according to an exemplary embodiment. As shown in FIG. 2, the receiving unit 108 can include an input unit 210 configured to be operated by the operator of the exemplary apparatus 100 to input the first configuration information $CI(1)_{P1}$ of the first airborne vehicle 132 via the first protocol P1. The input unit 210 can include a user interface installed in the exemplary apparatus 100.

For example, the input unit 210 can include a controller 220 and a plurality of switches $230_1, 230_2 \ldots 230_n$. The controller 220 illustrated in the example of FIG. 2 represents a stick controller for the exemplary embodiment in which the apparatus 100 is an aircraft. For example, the controller 220 can be a hands on throttle-and-stick (HOTAS) aircraft cockpit human-machine interaction (HMI) controller that allows the operator of the aircraft to access functions of the cockpit of the aircraft while piloting the aircraft. Alternatively, the controller 220 can be a yoke flight controller for piloting the exemplary apparatus 100, for example. The controller 220 can also include a throttle quadrant, for example. The exemplary embodiments disclosed herein are not limited to the aforementioned examples of the controller 220. As described above, the exemplary apparatus 100 can be an aircraft, a land-based vehicle and/or a naval-based vehicle. Accordingly, the controller 220 can include any device or instrument configured to facilitate control of the apparatus 100 by an operator. For example, in the case of a land-based or naval-based vehicle, the controller 220 can be a steering wheel, yoke controller, throttle controller or any other control instrument. In essence, the controller 220 is configured to be operated by the operator of the exemplary apparatus 100, and to receive manual or vocal instructions from the operator, including, but not limited to, navigation instructions, vehicle control instructions and configuration instructions for operating an airborne vehicle, such as the first airborne vehicle 132 and/or the second airborne vehicle 152.

The plurality of switches $230_1, 230_2 \ldots 230_n$ are configured to be operated by the operator of the exemplary apparatus 100, and to receive instructions including, but not limited to, navigation instructions, vehicle control instructions and configuration instructions for operating an airborne vehicle, such as the first airborne vehicle 132 and/or the second airborne vehicle 152. For ease of illustration, the plurality of switches $230_1, 230_2 \ldots 230_n$ are illustrated separately from the controller 220 in FIG. 2. However, one or more of the plurality of switches $230_1, 230_2 \ldots 230_n$ can be embodied on the controller 220. Therefore, one or more of the plurality of switches $230_1, 230_2 \ldots 230_n$ can be installed in an operation environment of the exemplary apparatus 100, such as a cockpit of an aircraft, for example, and one or more of the plurality of switches $230_1, 230_2 \ldots 230_n$ can be installed in or mounted onto the controller 220 to be operated by the operator of the exemplary apparatus 100. In addition, the plurality of switches $230_1, 230_2 \ldots 230_n$ can be any type of electromechanical switch or combination of types of switches, such as toggle, rocker, pushbutton, pressure, selector, motion-activated, actuator, limit, proximity, speed and temperature switches, for example.

As shown in FIG. 1, the holding device 130 can be configured to hold a plurality of the first airborne vehicles 132. As shown in the examples of FIGS. 1 and 2, the receiving unit 108 can also receive the first configuration information $CI(1)_{P1}$ of the first airborne vehicle 132 from the interface 138 via the first protocol P1. The first configuration information $CI(1)_{P1}$ received from the interface 138 can include, for example, initialization instructions of the first airborne vehicle 132, and a remaining number instruction indicating a remaining number of the plurality of first airborne vehicles 132 available in the holding device 130. The initialization instructions from the interface 138 can include a designation of whether one or more of the first airborne vehicles 132 is presently configured to be launched from the holding device 130. The receiving unit 108 can be configured to automatically receive the remaining number instruction from the interface 138 upon one of the airborne vehicles of the first type 132 being launched from the holding device 130. In addition, the receiving unit 108 can be configured to receive the remaining number instruction from the interface 138 in response to a request from the operator of the exemplary apparatus 100.

Referring to the example of FIG. 1, the output unit 110 can be configured to output the first configuration information $CI(1)_{P1}$ received by the receiving unit 108 to the display 114 via the first protocol P1. The display 114 can be configured to display the first configuration information $CI(1)_{P1}$ of the first airborne vehicle 132 via the first protocol P1.

The exemplary apparatus 100 can also comprise the holding device 150 configured to hold the second airborne vehicle 152, which operates in accordance with a communication of the first protocol P1. The interface 106 can therefore communicate with both the holding device 130 and the holding device 150 via the first protocol P1. The plurality of first airborne vehicles 132 can be a laser guided rocket, such as the APKWS, DAGR™ and LOGIR weapons described above, and the second airborne vehicle 152 can be a guided missile, such as the HELLFIRE® missile. Accordingly, the holding device 130 can be a canister configured to hold a plurality of laser guided rockets, and to launch the laser guided rockets via the second protocol P2. For example, the holding device 130 can be a M260 or M261 canister configured to launch the Hydra-70 rockets that are guidance-modified according to the above-described APKWS, DAGR™ and LOGIR weapons. In addition, the holding device 150 can be a canister configured to hold the guided missile, and to launch the guided missile via the first protocol P1. For example, the holding device 150 can be the M299 canister for holding and launching the HELLFIRE® II missile.

Figure 4:
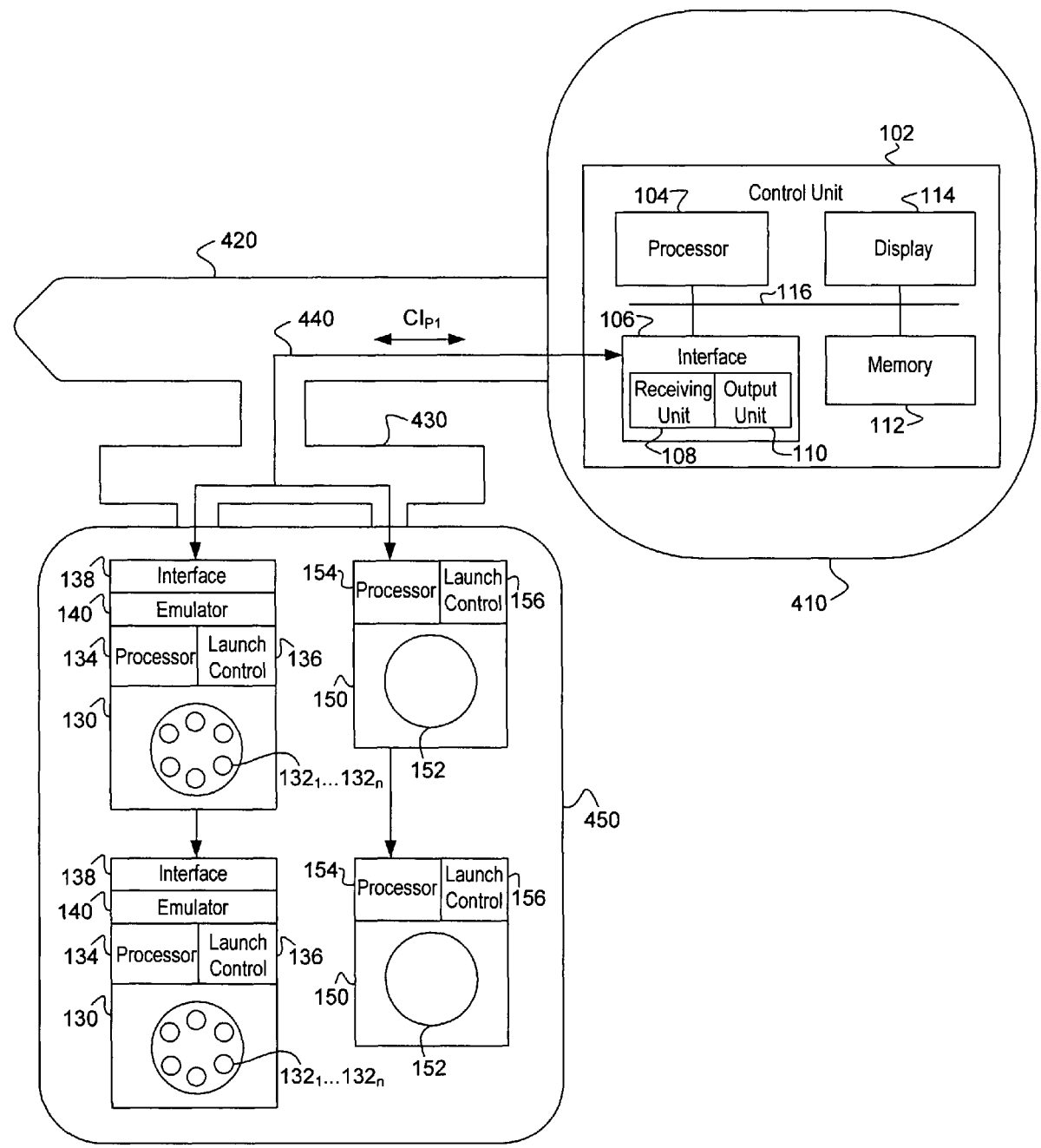
FIG. 4 is a block diagram illustrating the exemplary apparatus configured as an aircraft according to an exemplary embodiment.

As shown in the example of FIG. 1, the holding device 130 can be equipped with an optional mount 162 to mount the holding device 130 to a desired portion of the exemplary apparatus 100, and the holding device 150 can be equipped with an optional mount 164 to mount the holding device 150 to a desired portion of the exemplary apparatus 100. For example, as shown in FIG. 4, the exemplary apparatus 100 can include a platform 430 configured to mount the holding device 130 and the holding device 150 to the exemplary apparatus 100. In the example of FIG. 4, the platform 430 corresponds to the optional mounts 162, 164 for mounting the holding device 130 and the holding device 150 to the exemplary apparatus 100. Furthermore, in the example of FIG. 4, two holding devices 130 and two holding devices 150 are illustrated as being mounted by the platform 430. The exemplary embodiments described herein are not limited to the combination of holding devices 130 and 150 illustrated in the example of FIG. 4. For example, three holding devices 130 and one holding device 150 can be mounted by the platform 430. In addition, one or more of the holding devices 150 illustrated in the example of FIG. 4 may be another holding device for holding and launching a third type of airborne vehicle, such as a Joint Common Missile (JCM) or a Joint Air-to-Surface Standoff Missile (JASSM), for example.

In the example of FIG. 4, the platform 430 can include a launcher 450 configured to launch the second airborne vehicle 152 held in the holding device 150. For example, the launcher 450 can be the M299 canister for holding the HELLFIRE® II guided missile, and the launcher 450 can fire a thermal battery of the HELLFIRE® II guided missile to launch the HELLFIRE® II guided missile. In order to be operable with the launcher 450 that is configured to launch the second airborne vehicle 152, the holding device 130 is adaptively structured to be mounted to the launcher 450 to launch the first airborne vehicle 132.

In the example of FIG. 4, the exemplary apparatus 100 is illustrated as an aircraft. The aircraft includes an operation environment 410, such as a cockpit of a helicopter or jet fighter, and a wing 420. As shown in FIG. 4, the control unit 102 is installed in the operation environment 410 of the aircraft, and the interface 106 of the control unit 102 communicates with the holding devices 130 and 150 via the first protocol P1 by using a common communication medium 440, such as a bus. In the example of FIG. 4, the platform 430 can be configured to mount the holding device 130 and the holding device 150, as held in the launcher 450, to the wing 420 of the aerial vehicle.

The interface 106 is configured to communicate via the first protocol P1. Referring to the examples of FIGS. 1 and 2, the receiving unit 108 of the interface 106 is configured to receive, as a communication of the first protocol P1, first configuration information $CI(1)_{P1}$ of the first airborne vehicle 132 via the first protocol P1, and to receive second configuration information $CI(2)_{P1}$ of the second airborne vehicle 152 via the first protocol P1. As shown in the example of FIG. 2, the receiving unit 108 can be configured to receive the first configuration information $CI(1)_{P1}$ of the first protocol P1 from the interface 138 and/or from the operator of the exemplary apparatus 100. As also shown in the example of FIG. 2, the receiving unit 108 can also be configured to receive the second configuration information $CI(2)_{P1}$ of the first protocol P1 from the holding device 150 and/or from the operator of the exemplary apparatus 100. The output unit 110 can be configured to output the received first configuration information $CI(1)_{P1}$ to the interface 138 via the first protocol P1 to operate the first airborne vehicle 132, and to output the received second configuration information $CI(2)_{P1}$ to the holding device 150 via the first protocol P1 to operate the second airborne vehicle 152. In addition, the output unit 110 can be configured to output the received first configuration information $CI(1)_{P1}$ of the first protocol P1 and the second configuration information $CI(2)_{P1}$ of the first protocol P1 to the display 114 to enable the operator of the exemplary apparatus 100 to operate the first airborne vehicle 132 and/or the second airborne vehicle 152. The first configuration information $CI(1)_{P1}$ of the first protocol P1 can include instructions and parameters for operating the first airborne vehicle 132, and the second configuration information $CI(2)_{P1}$ of the first protocol P1 can include instructions and parameters for operating the second airborne vehicle 152.

The plurality of first airborne vehicles 132 operate according to the second protocol P2. However, the interface 138 receives the first configuration information $CI(1)_{P1}$ of the first protocol P1 for operating the first airborne vehicles 132. That is, the first configuration information $CI(1)_{P1}$ of the first protocol P1 includes instructions and parameters for operating a guided airborne vehicle, such as the guidance-modified first airborne vehicle 132, although the first configuration information $CI(1)_{P1}$ is transmitted to the holding device 130, which is configured to launch an unguided missile, such as the Hydra-70 rockets described above. Therefore, the emulator 140 installed in the holding device 130 is configured to convert the first configuration information $CI(1)_{P1}$ of the first protocol P1 into configuration information $CI_{P2}$ of the second protocol P2, in order to result in configuration information $CI_{P2}$ that is operable with the holding device 130 and the first airborne vehicle 132. The emulator 140 is configured to convert a data stream of one protocol, such as the first protocol P1, into a data stream of another protocol, such as the second protocol P2, according to a predetermined algorithm, in order to essentially trick the holding device 130 into operating as if the interface 138 had received a communication of the second protocol P2.

In particular, the interface 138 can be configured to output the first configuration information $CI(1)_{P1}$ of the first airborne vehicle 132 received from the output unit 110 to the emulator 140 via the first protocol P1. As shown in the example of FIG. 1, the emulator 140 can be configured to convert the received first configuration information $CI(1)_{P1}$ of the first protocol P1 into second configuration information $CI_{P2}$ of the second protocol P2 for operating the first airborne vehicle 132. The emulator 140 can also be configured to communicate with the first airborne vehicle 132 via the second protocol P2, and to output the converted configuration information $CI_{P2}$ of the second protocol P2 to the first airborne vehicle 132 to operate the first airborne vehicle 132.

As shown in the example of FIG. 1, the holding device 130 includes a processor 134 and a launch control 136. The processor 134 can be configured to control the operations of the holding device 130. The processor 134 can also be configured to receive the converted configuration information $CI_{P2}$ of the second protocol P2 from the emulator 140, and to transmit the converted configuration information $CI_{P2}$ of the second protocol P2 to the launch control 136. The launch control 136, which is equipped with the necessary software and hardware components to operate the first airborne vehicle 132, outputs an operation instruction $OI_{P2}$ of the second protocol P2 to one or more of the plurality of first airborne vehicles 132. The operation instruction $OI_{P2}$ of the second protocol P2 can include guidance instructions for launching one or more of the plurality of first airborne vehicles 132. For example, since the first airborne vehicles 132 can be adapted to have laser-guided coordinates, the operation instruction $OI_{P2}$ of the second protocol P2 can be a coordinates instruction corresponding to the target for which a laser guided homing instruction was created by the operator of the exemplary apparatus 100, for example. The operation instruction $OI_{P2}$ of the second protocol P2 can also include initialization instructions for firing the thermal battery of one or more of the first airborne vehicles 132, and a launch instruction to launch (fire) one or more of the first airborne vehicles 132.

In addition, the first airborne vehicle 132 can be configured to output the configuration information $CI_{P2}$ of the second protocol P2 to the emulator 140. For example, as shown in FIG. 1, one or more of the first airborne vehicles 132 can output an operation instruction $OI_{P2}$ of the second protocol P2 to the launch control 136, which outputs the received operation instruction $OI_{P2}$ of the second protocol P2 to the processor 134. The processor 134 can be configured to process the received operation instruction $OI_{P2}$ of the second protocol P2 as the configuration information $CI_{P2}$ of the second protocol P2, and to output the processed configuration information $CI_{P2}$ of the second protocol P2 to the emulator 140. The emulator 140 can be configured to convert the configuration information $CI_{P2}$ of the second protocol P2 received from the first airborne vehicle 132 via the processor 134 into the first configuration information $CI(1)_{P1}$ of the first protocol P1, and to output the converted first configuration information $CI(1)_{P1}$ of the first protocol P1 to the interface 138 via the first protocol P1. The interface 138 can be configured to output the received converted first configuration information $CI(1)_{P1}$ of the first protocol P1 to the receiving unit 108 of the interface 106.

Since the second airborne vehicle 152 operates according to the first protocol P1, the holding device 150 can accurately process the received second configuration information $CI(2)_{P1}$ of the first protocol P1 to operate the second airborne vehicle 152. Consequently, it is not necessary for the holding device 150 to include an emulator 140, since the second airborne vehicle 152 operates according to the first protocol P1.

As shown in the example of FIG. 1, the holding device 150 can include a processor 154 configured to control the operations of the holding device 150. The processor 154 can be configured to receive the second configuration information $CI(2)_{P1}$ of the first protocol P1 from the output unit 110, and transmit the received second configuration information $CI(2)_{P1}$ of the first protocol P1 to a launch control 156. The launch control 156 of the holding device 150 includes the necessary software and hardware components to initialize and launch the second airborne vehicle 152, and is configured to output an operation instruction $OI_{P1}$ of the first protocol P1 to initialize and launch the second airborne vehicle 152 upon receiving the second configuration information $CI(2)_{P1}$ of the first protocol P1 from the processor 154. The second airborne vehicle 152 can also be configured to output an operation instruction $OI_{P1}$ of the first protocol P1 to the launch control 156. The launch control 156 can then output the received operation instruction $OI_{P1}$ of the first protocol P1 to the processor 154. The processor 154 can be configured to process the received operation instruction $OI_{P1}$ of the first protocol P1 as the second configuration information $CI(2)_{P1}$ of the first protocol P1, and to output the processed second configuration information $CI(2)_{P1}$ of the first protocol P1 to the receiving unit 108 of the interface 106.

Figure 3:
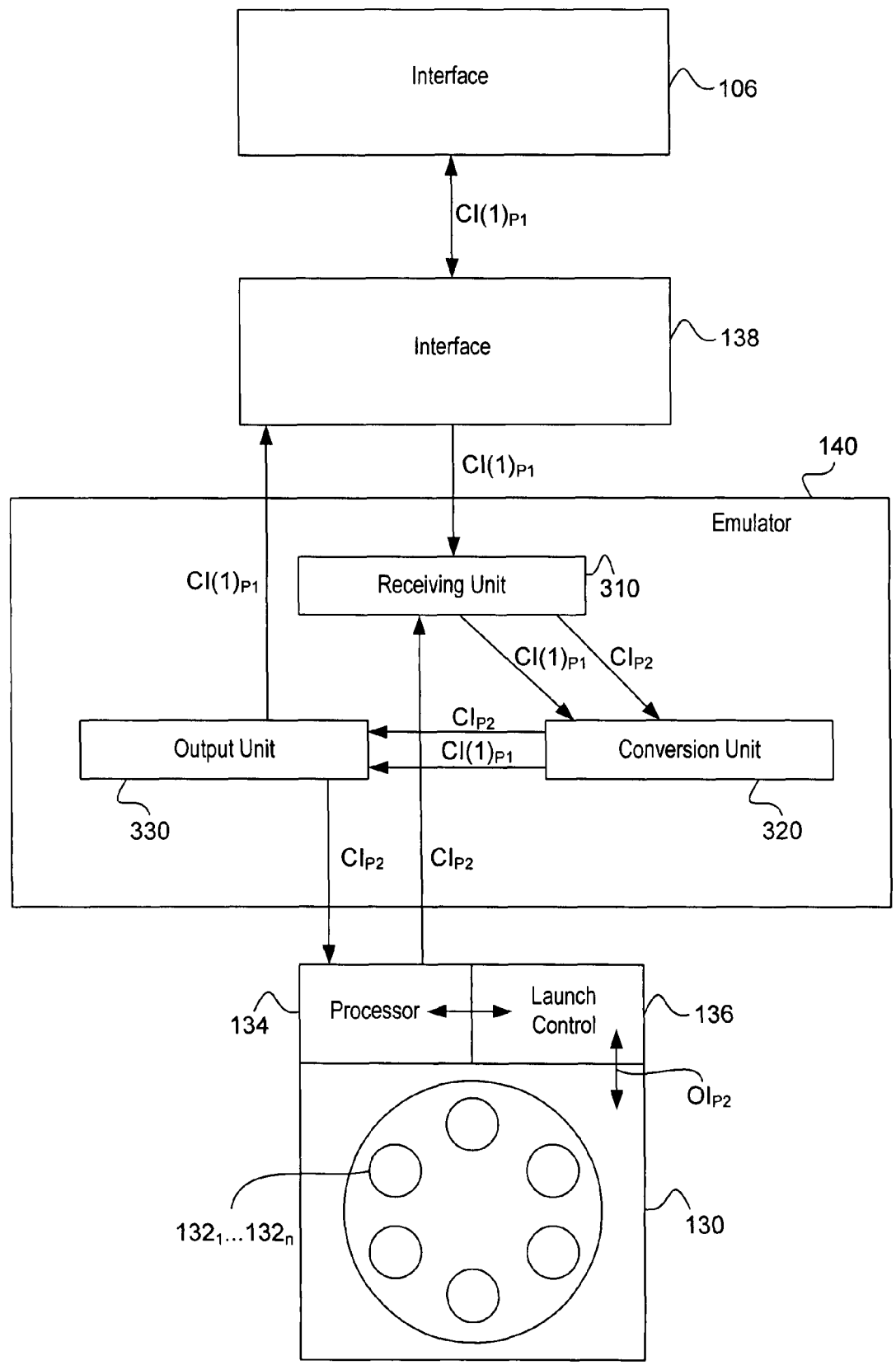
FIG. 3 is a block diagram illustrating components of an emulator of the exemplary apparatus.

The components of the emulator 140 according to an exemplary apparatus will now be described with reference to FIG. 3. As shown in the example of FIG. 3, the emulator 140 can include a receiving unit 310 configured to receive a first communication of a first protocol P1 for operating the first airborne vehicle 132, which operates in accordance with a communication of a second protocol P2, and to receive a second communication of the second protocol P2 from the first airborne vehicle 132.

The emulator 140 can also include a conversion unit 320 configured to convert at least one of the received first communication of the first protocol P1 into the second communication of the second protocol P2, and the received second communication of the second protocol P2 into the first communication of the first protocol P1. That is, the conversion unit 320 can be configured to have a one-way conversion function, such as converting the first communication of the first protocol P1 received from the interface 138 into the second communication of the second protocol P2, or converting the second communication of the second protocol P2 received from the first airborne vehicle 132 into the first communication of the first protocol P1. Alternatively, the conversion unit 320 can be configured to have a two-way conversion function, such as converting the first communication of the first protocol P1 received from the interface 138 into the second communication of the second protocol P2, and converting the second communication of the second protocol P2 received from the first airborne vehicle 132 into the first communication of the first protocol P1.

The conversion unit 320 can be configured to convert a data stream representing the first communication of the first protocol P1 into the second communication of the second protocol P2 according to a predefined algorithm and/or conversion table of convertible instructions. The conversion unit 320 can include a predefined algorithm programmed therein for converting the first communication of the first protocol P1 into the second communication of the second protocol P2, and vice versa. For example, the emulator 140 can be configured to convert a launch instruction of the first protocol P1 for launching the second airborne vehicle 152 into a launch instruction of the second protocol P2 for launching the first airborne vehicle 132, according to the programmed algorithm. Similarly, the conversion unit 320 can be configured to convert an instruction of the first protocol P1 to navigate towards a laser signal aimed at a target into a navigation instruction of the second protocol P2 for homing in on the reflected laser energy beam aimed at the target, according to the programmed algorithm. The algorithm programmed in the conversion unit 320 results in the conversion of a communication of the first protocol P1 into a communication of the second protocol P2, and vice versa.

The conversion unit 320 can alternatively or additionally be programmed with a conversion table of convertible instructions between instructions of the first protocol P1 and instructions of the second protocol P2. In particular, the conversion table can include a list of instructions of the first protocol P1 and a respectively corresponding list of instructions of the second protocol P2. When the conversion unit 320 receives a communication of the first protocol P1, the conversion unit 320 is configured to retrieve the corresponding instruction of the second protocol P2 from the conversion table, and vice versa. Upon retrieving the corresponding instruction of the second protocol P2 from the conversion table, the conversion unit 320 substitutes the instruction of the first protocol P1 with the corresponding instruction of the second protocol P2 retrieved from the conversion table, and thereby converts the instruction of the first protocol P1 into the instruction of the second protocol P2. The conversion unit 320 can similarly convert an instruction of the second protocol P2 into a corresponding instruction of the first protocol P1 by utilizing the conversion table.

The communication of the first protocol P1 can be an analog signal, and the communication of the second protocol P2 can be a digital signal, for example. In this case, the conversion unit 320 can be configured to convert the analog signal of the first protocol P1 received from the interface 138 into a corresponding digital signal of the second protocol P2. Similarly, the conversion unit 320 can be configured to convert a digital signal of the second protocol P2 received from the first airborne vehicle 132 into a corresponding analog signal of the first protocol P1.

The communication of the first protocol P1 can also be a digital signal. The communication of the first protocol P1, although transmitted from the interface 106 to the interface 138 for operating the first airborne vehicle 132, is transmitted in the format of a communication for operating the second airborne vehicle 152. Therefore, if the communication of the first protocol P1 received from the interface 106 by the interface 138 is a digital signal, the conversion unit 320 is configured to convert the digital communication of the first protocol P1 into a digital communication that is operable with the first airborne vehicle 132.

In essence, the conversion unit 320 is configured to convert received communications to be compatible with the device or airborne vehicle for which the communications are intended to be received. Accordingly, in the case of a communication that is intended to be received by the first airborne vehicle 132 held in the holding device 130, the conversion unit 320 is configured to convert the received communication into a communication of the second protocol P2, since the first airborne vehicle 132 operates in accordance with a communication of the second protocol P2. On the other hand, in the case of a communication that is intended to be received by the interface 106 via the interface 138, the conversion unit 320 is configured to convert a communication of the second protocol P2 received from the first airborne vehicle 132 into a communication of the first protocol P1, since the interfaces 106 and 138 communicate via the first protocol P1.

Furthermore, the conversion algorithm and/or conversion table programmed in the conversion unit 320 can be modified or adapted whenever new instructions and/or functions are created for an airborne vehicle equipped in the exemplary apparatus 100, such as the first airborne vehicle 132 and the second airborne vehicle 152.

The emulator 140 can also include an output unit 330 configured to output at least one of the converted second communication of the second protocol P2 to the first airborne vehicle 132 for operating the first airborne vehicle 132, and the converted first communication of the first protocol P1 to the interface 106 enabling an operator to control an operation of the first airborne vehicle 132.

As shown in FIG. 3, the receiving unit 310 can be configured to receive configuration information $CI(1)_{P1}$ of the first protocol P1, as the first communication of the first protocol P1, that includes instructions and parameters for operating the first airborne vehicle 132, from the interface 138. The receiving unit 310 can be configured to receive configuration information $CI_{P2}$ of the second protocol P2, as the second communication of the second protocol P2, from the first airborne vehicle 132.

The conversion unit 320 can be configured to convert the received configuration information $CI(1)_{P1}$ of the first protocol P1 into the configuration information $CI_{P2}$ of the second protocol P2, and to convert the received configuration information $CI_{P2}$ of the second protocol P2 into the configuration information $CI(1)_{P2}$ of the first protocol P1, by using the above-described conversion techniques.

As shown in FIG. 3, the output unit 330 can be configured to output the converted configuration information $CI_{P2}$ of the second protocol P2 to the airborne vehicle 132 for operating the first airborne vehicle 132, and to output the converted first configuration information $CI(1)_{P1}$ of the first protocol P1 to the interface 106 via the interface 138 to enable the operator of the exemplary apparatus 100 to control an operation of the first airborne vehicle 132.

As shown in the examples of FIGS. 1 and 3, the emulator 140 can be configured to communicate with the holding device 130, which is configured to hold the first airborne vehicle 132 and to launch the first airborne vehicle 132 in accordance with the converted configuration information $CI_{P2}$ of the second protocol P2. The receiving unit 310 of the emulator 140 can be configured to receive the configuration information $CI_{P2}$ of the second protocol P2 from the first airborne vehicle 132 via the holding device 130. The output unit 330 of the emulator 140 can be configured to output the converted configuration information $CI_{P2}$ of the second protocol P2 to the first airborne vehicle 132 via the holding device 130.

The first airborne vehicle 132 can be a laser guided rocket, such as the aforementioned APKWS, DAGR™ and LOGIR weapons. Accordingly, the holding device 130 can be a canister for holding and launching at least one guided rocket, and is adaptively structured to be operable with a launcher configured to launch an airborne vehicle of a different type than the at least one guided rocket, such as the second airborne vehicle 152, for example.

According to an exemplary embodiment, the receiving unit 310 of the emulator 140 is configured to receive the first communication of the first protocol P1 from the interface 106 via the interface 138 of the holding device 130. The first communication of the first protocol P1 can include instructions and parameters for operating the first airborne vehicle 132.

Exemplary embodiments have been described with reference to the first airborne vehicle 132 and the second airborne vehicle 152. In the exemplary apparatus 100 illustrated in FIG. 1, the holding device 130 is provided with the emulator 140 to convert between a communication of the first protocol P1 and a communication of the second protocol P2, since the first airborne vehicle 132 operates in accordance with a communication of the second protocol P2, while the interfaces 106 and 138 communicate via the first protocol P1. The exemplary apparatus 100 can also be equipped with an airborne vehicle of a third type, such as a JCM, for example, which operates in accordance with a communication of a third protocol P3. In this case, a holding device for holding and launching the third airborne vehicle can be embodied with an emulator similar to the emulator 140 embodied in the holding device 130, in order to convert between a communication of the first protocol P1 and a communication of the third protocol P3 for operating the third airborne vehicle. The emulator embodied in the holding device of the third airborne vehicle can be configured to perform a conversion operation similar to the conversion operation of the conversion unit 320 as described above.

Figure 5:
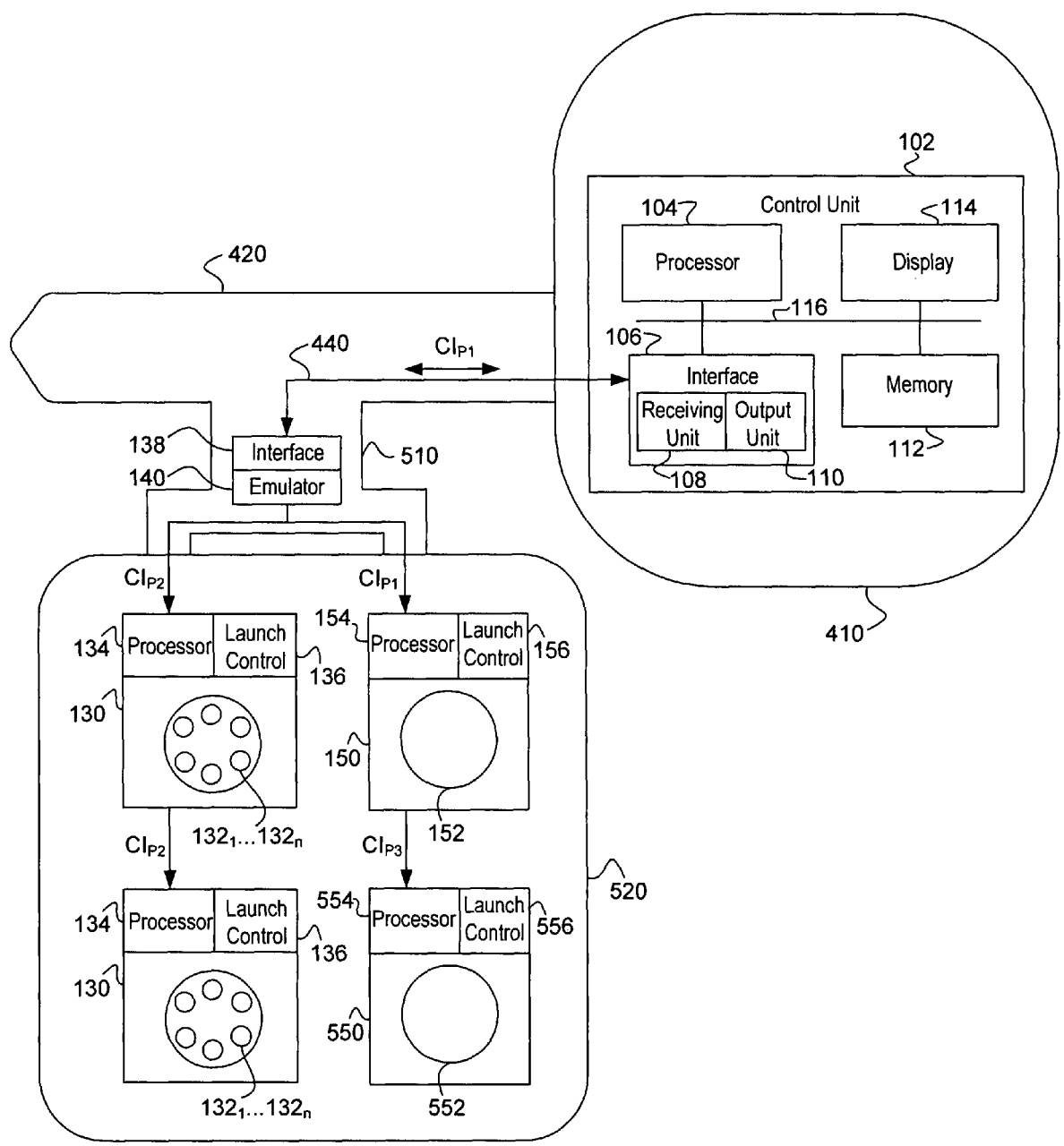
FIG. 5 is a block diagram illustrating the exemplary apparatus configured as an aircraft according to an exemplary embodiment.

According to another exemplary embodiment, the interface 138 and emulator 140 embodied in the holding device 130 can instead be embodied in a platform of a vehicle from which a plurality of different types of airborne vehicles are to be launched, such as the first airborne vehicle 132, the second airborne vehicle 152 and a third airborne vehicle 552 of a third type as illustrated in FIG. 5, for example. FIG. 5 is a block diagram illustrating the exemplary apparatus 100 configured as an aircraft according to another exemplary embodiment. Similar to FIG. 4, the aircraft can include an operation environment 410, such as a cockpit of a helicopter or jet fighter, and a wing 420. The control unit 102 can be installed in the operation environment 410 of the aircraft, and the interface 106 of the control unit 102 can communicate with the holding devices 130 and 150 via the first protocol P1 by using a common communication medium 440, such as a bus. In addition, the interface 106 can communicate with a holding device 550 configured to hold the third airborne vehicle 552, via the first protocol P1.

In the example of FIG. 5, a launcher 520 is configured to hold two holding devices 130, the holding device 150, and the holding device 550. The launcher 520 can be configured to launch the second airborne vehicle 152, such as an M299 HELLFIRE® canister, for example. As shown in FIG. 5, the exemplary apparatus 100 illustrated as an aircraft includes a platform 510 to which the launcher 520 is mounted. The interface 138 and emulator 140 previously described as being embodied in the holding device 130 are illustrated in the example of FIG. 5 as being embodied in the platform 510. The interface 138 and emulator 140 included in the platform 510 serve the functions of the interface 138 and emulator 140 embodied in the holding device 130 according to the above-described exemplary embodiments. Accordingly, the interface 138 and emulator 140 are not separately provided for each of the two holding devices 130 and the holding device 550 illustrated in FIG. 5. As such, the interface 138 and emulator 140 embodied in the platform 510 are configured to perform the communication and conversion functions for the holding devices 130 and the holding device 550, since the first airborne vehicle 132 and third airborne vehicle 552 operate in accordance with the second and third protocols P2 and P3, respectively.

As shown in FIG. 5, the interface 106 of the control unit 102 and the interface 138 embodied in the platform 510 communicate with each other according to the first protocol P1. In particular, the interfaces 106 and 138 can be configured to exchange configuration information $CI_{P1}$ of the first protocol P1 therebetween. The emulator 140 embodied in the platform 510 is configured to communicate with the launcher 520 and with the interface 138. In the example of FIG. 5, the launcher 520 is configured to hold and launch one or more of the first airborne vehicles 132, which operate in accordance with configuration information $CI_{P2}$ of the second protocol P2, the second airborne vehicle 152, which operates in accordance with configuration information $CI_{P1}$ of the first protocol P1, and the third airborne vehicle 552, which operates in accordance with configuration information $CI_{P3}$ of the third protocol P3. As shown in FIG. 5, the holding device 550 can include a processor 554 and a launch control 556, similar to the holding devices 130 and 150. The processor 554 and launch control 556 of the holding device 550 perform similar functions to those of the processor 134, 154 and the launch control 136, 156, and thus will not be described further.

In the example of FIG. 5, the interface 138 can also be configured to detect whether the configuration information $CI_{P1}$ received from the interface 106 is for operating one or more of the first airborne vehicles 132, the second airborne vehicle 152, and the third airborne vehicle 552. For example, the operator of the exemplary apparatus 100 can designate one or more of the airborne vehicles 132, 152 and 552 by using the above-described input unit 210 of the interface 106. The interface 106, when transmitting the configuration information $CI_{P1}$ of the first protocol P1, can designate whether the configuration information $CI_{P1}$ is intended for operating one or more of the airborne vehicles 132, 152 and 552. Based on such a designation by the interface 106, the interface 138 can be configured to detect whether the received configuration information $CI_{P1}$ of the first protocol P1 is to be received by the holding device(s) 130 and/or the holding device 550. If the interface 138 detects that the configuration information $CI_{P1}$ of the first protocol P1 is to be received by the holding device(s) 130 and/or the holding device 550, the interface 138 can be configured to inform the emulator 140 that the configuration information $CI_{P1}$ is to be converted into the appropriate protocol, i.e., the second protocol P2 and/or the third protocol P3. If the configuration information $CI_{P1}$ is intended to be received by the second airborne vehicle 152, the interface 138 can be configured to inform the emulator 140 not to convert the received configuration information $CI_{P1}$ of the first protocol P1, since the second airborne vehicle 152 operates in accordance with a communication of the first protocol P1.

Accordingly, the configuration information $CI_{P1}$ of the first protocol P1 can include parameters and instructions for operating one or more of the first airborne vehicle 132, the second airborne vehicle 152, and the third airborne vehicle 552. The conversion unit 320 of the emulator 140 can be configured to convert the received configuration information $CI_{P1}$ of the first protocol P1 into the configuration information $CI_{P2}$ of the second protocol P2 for operating the one or more of the first airborne vehicles 132, and to convert the received configuration information $CI_{P1}$ of the first protocol P1 into the configuration information $CI_{P3}$ of the third protocol P3 for operating the third airborne vehicle 552, by using the above-described conversion techniques.

The receiving unit 310 of the emulator 140 can be configured to receive the configuration information $CI_{P2}$ of the second protocol P2 from one or more of the first airborne vehicles 132 via the launcher 520, and to receive the configuration information $CI_{P3}$ of the third protocol P3 from the third airborne vehicle 552 via the launcher 520. The conversion unit 320 can also be configured to convert the configuration information $CI_{P2}$ of the second protocol P2 received from the first airborne vehicle 132 into the configuration information $CI_{P1}$ of the first protocol P1, and convert the configuration information $CI_{P3}$ of the third protocol P3 received from the third airborne vehicle 552 into the configuration information $CI_{P1}$ of the first protocol P1.

Another exemplary apparatus provides an airborne vehicle holding device for holding and launching an airborne vehicle of a first type, such as the holding device 130 illustrated in FIG. 1, for example. As shown in FIG. 1, the holding device 130 is configured to hold and launch the first airborne vehicle 132. The holding device 130 includes the interface 138 configured to communicate with the interface 106 via the first protocol P1 to receive a communication of the first protocol P1 for operating the first airborne vehicle 132, which is configured to operate in accordance with a communication of the second protocol P2.

The holding device 130 also includes a canister configured to hold the first airborne vehicle 132. For example, the canister can be the M260 launch canister for holding and launching a guidance-modified rocket, such as the APKWS, DAGR™ and LOGIR weapons. As shown in FIG. 4, the canister of the holding device 130 can be adaptively structured to be mounted to the launcher 450, which is configured to launch the second airborne vehicle 152. For example, the launcher 450 may be the M299 or equivalent HELLFIRE® missile launcher.

The launcher 450 can include a plurality of rails onto which a plurality of the second airborne vehicles 152 can be mounted to be launched. According to this exemplary embodiment, the canister of the holding device 130 can be adaptively structured to be mounted to one of the rails of the launcher 450, such that the canister of the holding device 130 would be mounted to the launcher 450 instead of the second airborne vehicle 152. The holding device 130 can be equipped with the mount 162 illustrated in FIG. 1 to detachably or permanently attach the canister of the holding device 130 to the launcher 450. For example, the mount 162 can be configured to slide onto one of the rails of the launcher 450 in order to detachably or permanently attach the canister of the holding device 130 to the launcher 450. The exemplary embodiments disclosed herein include any technique of mounting the canister of the holding device 130 to the launcher 450, and are not limited to the above-described example.

As shown in the example of FIG. 1, the holding device 130 can also include the emulator 140 configured to convert the received communication of the first protocol P1 into a communication of the second protocol P2 for operating the first airborne vehicle 132 via the second protocol P2, and/or a communication of the second protocol P2 received from the first airborne vehicle 132 into a communication of the first protocol P1 to be outputted to the first interface 138 via the first protocol P1. Similar to the above-described exemplary embodiments, the conversion unit 320 of the emulator 140 can be configured to have a one-way conversion function, such as converting the communication of the first protocol P1 received from the interface 138 into the communication of the second protocol P2, or converting the communication of the second protocol P2 received from the first airborne vehicle 132 into the communication of the first protocol P1. Alternatively, the conversion unit 320 can be configured to have a two-way conversion function, such as converting the communication of the first protocol P1 received from the interface 138 into the communication of the second protocol P2, and converting the communication of the second protocol P2 received from the first airborne vehicle 132 into the communication of the first protocol P1.

The first interface 138 can be configured to receive configuration information $CI(1)_{P1}$ of the first protocol P1, as the communication of the first protocol P1, from the interface 106. The emulator 140 can be configured to receive configuration information $CI_{P2}$ of the second protocol P2, as the communication of the second protocol P2, from the first airborne vehicle 132. The emulator 140 can also be configured to convert the configuration information $CI(1)_{P1}$ of the first protocol P1 received from the interface 138 into the configuration information $CI_{P2}$ of the second protocol P2 for operating the first airborne vehicle 132 according to the converted configuration information $CI_{P2}$ of the second protocol P2. Furthermore, the emulator 140 can be configured to convert the configuration information $CI_{P2}$ of the second protocol P2 received from the first airborne vehicle 132 into the configuration information $CI(1)_{P1}$ of the first protocol P1, and to output the converted configuration information $CI(1)_{P1}$ of the first protocol P1 to the first interface 138 via the first protocol P1.

Similar to the above-described exemplary embodiments, the configuration information $CI(1)_{P1}$ of the first protocol P1 includes one or more of a power on/off instruction, a test instruction, a coordinates instruction and a launch instruction for operating the first airborne vehicle 132. In addition, the configuration information $CI_{P2}$ received from the first airborne vehicle 132 can include one or more of initialization instructions, and a remaining number instruction indicating a remaining number of a plurality of the first airborne vehicles 132 available in the canister of the holding device 130.

The first airborne vehicle 132 can be a laser guided rocket, such as the APKWS, DAGR™ and LOGIR weapons, and the second airborne vehicle 152 can be a guided missile, such as a HELLFIRE® missile, for example. The launcher 450 can be configured to launch the guided missile 152, such as a HELLFIRE® launcher, for example. The canister of the holding device 130 adaptively mounted to the launcher 450 can be configured to launch the laser guided rocket according to the converted configuration information $CI_{P2}$ of the second protocol P2.

In the examples of FIGS. 1 and 3-5, the canister of the holding device 130 is illustrated as being a six-pack canister with six holding compartments (e.g., tubes) disposed around a circumferential portion of the canister. One of the plurality of first airborne vehicles $132_1 \ldots 132_n$ is configured to be respectively held and launched from one of the holding compartments of the canister. In addition, the interface 138 and emulator 140 are illustrated in the examples of FIGS. 1 and 3-5 as being disposed on a top surface of the canister. The exemplary embodiments disclosed herein are not limited to these example configurations. For example, the canister of the holding device 130 can be configured with one to n ($1<n<\infty$) holding compartments each configured to hold and launch one of the plurality of first airborne vehicles $132_1 \ldots 132_n$. The number of canister holding compartments can thus be set to include a desired number of first airborne vehicles $132_1 \ldots 132_n$. The canister of the holding device 130 can also be configured to have another holding compartment in any desired portion of the canister, such as in the center of the canister, for example, in which the interface 138 and the emulator 140 are installed. Furthermore, the canister of the holding device 130 can be of any shape, such as a rectangle or square shape, for example, and is not limited to a circular shape.

FIG. 1 illustrates a weapons system according to an exemplary embodiment. The weapons system can include first communication means for communicating via the first protocol P1. The first communication means can encompass the control unit 102 and the components thereof as illustrated in FIG. 1. The weapons system can also include first holding means for holding an airborne vehicle, such as the first airborne vehicle 132 illustrated in FIG. 1. The first holding means can encompass the holding device 130 and its canister as illustrated in FIG. 1.

The weapons system can include second communication means for communicating with the first communication means via the first protocol P1, and communicating with the airborne vehicle via the second protocol P2. The second communication means can encompass the interface 138 illustrated in FIG. 1. The weapons system can include conversion means for converting at least one of a communication of the first protocol P1 into a communication of the second protocol P2, and a communication of the second protocol P2 into a communication of the first protocol P1. The conversion means can encompass the emulator 140 illustrated in FIG. 1.

As illustrated in the examples of FIGS. 1 and 2, the first communication means can include receiving means for receiving configuration information $CI(1)_{P1}$ of the first airborne vehicle 132 via the first protocol P1. The receiving means can encompass the receiving unit 108 of the interface 106 as illustrated in FIGS. 1 and 2. The first communication means can also include output means for outputting the received configuration information $CI(1)_{P1}$ to at least one of the second communication means via the first protocol P1 and an operator of the weapons system via the first protocol P1. The output means can encompass the output unit 110 of the interface 106 and the display 114 of the control unit 102.

The second communication means can receive the configuration information $CI(1)_{P1}$ of the first airborne vehicle 132 from the output means via the first protocol P1, and output the received configuration information $CI(1)_{P1}$ of the first protocol P1 to the conversion means via the first protocol P1. The conversion means can convert the received configuration information $CI(1)_{P1}$ of the first protocol P1 into configuration information $CI_{P2}$ of the second protocol P2, and output the converted configuration information $CI_{P2}$ of the second protocol P2 to the first airborne vehicle 132 for operating the first airborne vehicle 132 via the second protocol P2.

The weapons system can be a vehicle such as an aircraft, for example, and the first communication means can receive the configuration information $CI(1)_{P1}$ of the first airborne vehicle 132 from an operator of the aircraft via the first protocol P1. The configuration information $CI(1)_{P1}$ of the first airborne vehicle 132 received by the second communication means from the first communication means via the first protocol P1 can include one or more of a power on/off instruction, a test instruction, a coordinates instruction and a launch instruction.

According to an exemplary embodiment, the second communication means can receive the configuration information $CI(1)_{P1}$ of the first protocol P1 for operating the first airborne vehicle 132 from the first communication means via the first protocol P1, and output the received configuration information $CI(1)_{P1}$ of the first protocol P1 to the conversion means via the first protocol P1. In addition, the conversion means can receive the configuration information $CI(1)_{P1}$ of the first protocol P1 outputted from the second communication means via the first protocol P1, and receive configuration information $CI_{P2}$ of the second protocol P2 from the first airborne vehicle 132 via the second protocol P2. The conversion means can convert the received configuration information $CI(1)_{P1}$ of the first protocol P1 into the configuration information $CI_{P2}$ of the second protocol P2, and output the converted configuration information $CI_{P2}$ of the second protocol P2 to the first airborne vehicle 132 to operate the first airborne vehicle 132. In addition, the conversion means can convert the received configuration information $CI_{P2}$ of the second protocol P2 into the configuration information $CI(1)_{P1}$ of the first protocol P1, and output the converted configuration information $CI(1)_{P1}$ of the first protocol P1 to the second communication means via the first protocol P1. The second communication means can output the converted configuration information $CI(1)_{P1}$ of the first protocol P1 received from the conversion means to the first communication means.

The conversion means can receive at least one of initialization instructions of the airborne vehicle and a remaining number instruction indicating a remaining number of a plurality of the first airborne vehicles 132 available in the first holding means as the configuration information $CI_{P2}$ of the second protocol P2 from at least one of the first airborne vehicle 132 via the second protocol P2.

Figure 6:
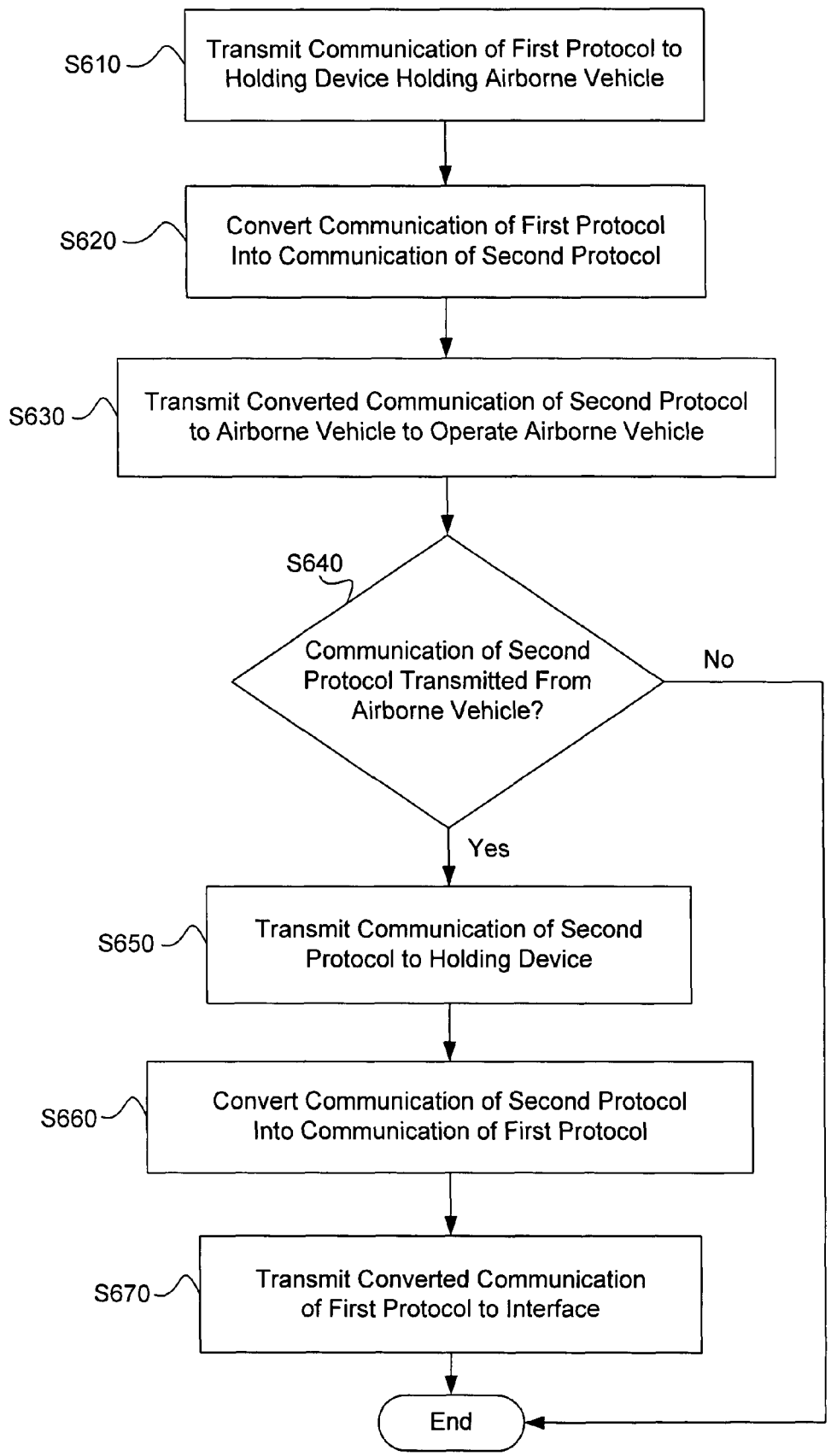
FIG. 6 is a flowchart illustrating an exemplary method of emulating an airborne vehicle.

FIG. 6 is a flowchart illustrating an exemplary method of emulating an airborne vehicle. The exemplary method can include transmitting a communication of a first protocol P1 to a holding device, such as the holding device 130 illustrated in FIG. 1, holding an airborne vehicle, such as one or more of the plurality of first airborne vehicles $132_1 \ldots 132_n$ illustrated in FIG. 1, which operate in accordance with a communication of a second protocol P2 (S610). The exemplary method can also include converting the communication of the first protocol P1 transmitted to the holding device into a communication of the second protocol P2 (S620). The exemplary method can also include transmitting the converted communication of the second protocol P2 to the airborne vehicle to operate the airborne vehicle (S630).

The exemplary method can also include determining whether a communication of the second protocol P2 is transmitted from the airborne vehicle (S640). If the determination is negative, there are no further operations to perform. On the other hand, if the determination is affirmative, the exemplary method can also include transmitting the communication of the second protocol P2 from the airborne vehicle to the holding device (S650). In addition, the exemplary method can include converting the communication of the second protocol P2 transmitted to the holding device into the communication of the first protocol P1 (S660). Furthermore, the exemplary method can include transmitting the converted communication of the first protocol P1 to an interface, such as the interfaces 106 and 138 illustrated in FIG. 1 (S670).

The exemplary method illustrated in FIG. 6 can be performed in accordance with the components of the above-described exemplary embodiments. Accordingly, the exemplary method illustrated in FIG. 6 can thereby achieve the advantages of the above-described exemplary embodiments in operating an airborne vehicle in a platform that communicates in a different protocol than the protocol with which the airborne vehicle operates.

Figure 7:
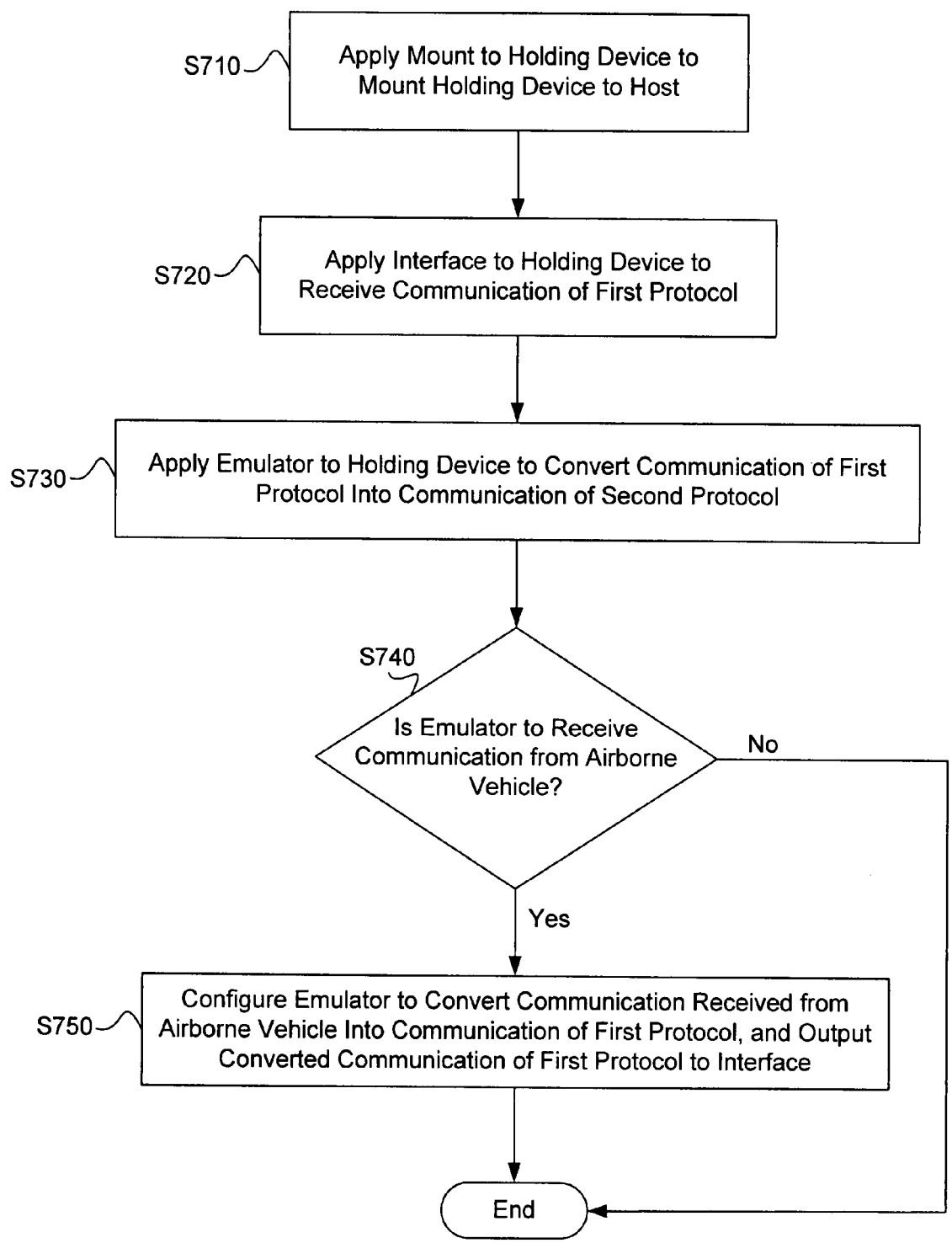
FIG. 7 is a flowchart illustrating an exemplary method of modifying a first holding device configured to hold and launch an airborne vehicle of a first type in order to emulate a second holding device configured to hold and launch an airborne vehicle of a second type.

FIG. 7 is a flowchart illustrating an exemplary method of modifying a first holding device configured to hold and launch an airborne vehicle of a first type in order to emulate a second holding device configured to hold and launch an airborne vehicle of a second type. The first holding device can be the holding device 130 illustrated in FIG. 1, and the second holding device can be the holding device 150 illustrated in FIG. 1, for example. The airborne vehicle of the first type can be one or more of the plurality of first airborne vehicles $132_1 \ldots 132_n$ illustrated in FIG. 1, for example. The airborne vehicle of the second type can be the second airborne vehicle 152 illustrated in FIG. 1, for example. Similar to the above-described exemplary embodiments, the second airborne vehicle is configured to operate according to a communication of a first protocol P1, and the first airborne vehicle is configured to operate according to a communication of a second protocol P2.

As illustrated in FIG. 7, the exemplary method includes applying a mount to the first holding device to enable the first holding device to be mounted to a host, such as the control unit 102 illustrated in FIG. 1, which is operable with the second holding device (S710). Similar to the above-described exemplary embodiments, the application of the mount to the first holding device can include any detachable or permanent attachment of the first holding device to the host (e.g., control unit 102) or a platform of the host, such as the platform 430 and launcher 450 illustrated in FIG. 4, for example.

The exemplary method includes applying an interface to the first holding device to enable the first holding device to communicate with the host and receive a communication of the first protocol P1 from the host. The interface applied to the first holding device can be the interface 138 illustrated in FIG. 1, for example.

In addition, the exemplary method includes applying an emulator to the first holding device to convert the communication of the first protocol P1 into a communication of the second protocol P2 so as to enable the first airborne vehicle to be operated according to the converted communication of the second protocol (S730). The emulator applied to the first holding device can be the above-described emulator 140 illustrated in FIGS. 1 and 3, for example. Alternatively, the emulator applied to the first holding device can be the above-described emulator 140 illustrated in FIG. 5, for example.

The exemplary method illustrated in FIG. 7 can also include determining whether the emulator applied to the first holding device is to receive a communication of the second protocol P2 from the first airborne vehicle. If the determination is negative, there are no further operations to perform. On the other hand, if the determination is affirmative, the exemplary method can also include configuring the applied emulator to convert the communication of the first protocol P1 into the communication of the second protocol P2, to convert a communication of the second protocol P2 receivable from the first airborne vehicle into the communication of the first protocol P1, and to output the converted communication of the first protocol P1 to the applied interface to enable the applied interface to communicate with the host 102.

The exemplary method illustrated in FIG. 7 can be performed in accordance with the components of the above-described exemplary embodiments. Accordingly, the exemplary method illustrated in FIG. 7 can thereby achieve the advantages of the above-described exemplary embodiments in operating an airborne vehicle in a platform that communicates in a different protocol than the protocol with which the airborne vehicle operates.

Combinations of the above-described exemplary embodiments, and other embodiments not specifically described herein will be apparent to those skilled in the art upon reviewing the above description. The scope of the various exemplary embodiments of the invention includes various other applications in which the above structures and methods are used.

For example, the first airborne vehicle 132 was exemplarily described as being a guidance-modified Hydra-70 rocket, such as the APKWS, DAGR™ and LOGIR weapons. The exemplary embodiments are not limited thereto. For example, the first airborne vehicle 132 can be any airborne vehicle that has been modified from its original design. In addition, the first airborne vehicle 132 can be any airborne vehicle for which existing platforms and/or host configurations are modified to incorporate such an airborne vehicle. The second-type airborne vehicle 152 was exemplarily described as being a HELLFIRE® missile. The exemplary embodiments are not limited thereto. For example, the second airborne vehicle 152 can be any guided missile. Such guided missiles, as the second-type airborne vehicle 152, may be embodied in a holding device, such as the holding device 150 and 550, for example, or may be directly mounted to a launching platform. Guided missiles directly mounted to a launching platform can be embodied with the processors and launch controls of the holding devices 150 and 550. The exemplary apparatus 100 and weapons system were described as being any aerial vehicle, land-based vehicle and/or naval-based vehicle. Such vehicles may be operated by a human operator, or may be autonomously operated by a computing device or program embodied in the vehicle or external to the vehicle. In addition, various aspects of the exemplary embodiments were described with reference to functions performed by structural components. It is to be understood that various aspects of the exemplary embodiments can also be performed by method operations or by a computer program that is recorded on a computer-readable medium and causes a computing device to perform the various aspects of the exemplary embodiments, as appropriate.

It will be appreciated by those skilled in the art that the present invention can be embodied in other specific forms without departing from the spirit or essential character thereof. The presently disclosed embodiments are considered in all respects to be illustrative and not restrictive. The scope of the invention is indicated by the appended claims rather than the foregoing description, and all changes that come within the meaning and range of equivalents thereof are indicated to be embraced therein.

What is claimed is:

1. An apparatus comprising:
a first interface configured to communicate via a first protocol;
a first holding device configured to hold an airborne vehicle, the first holding device including a second interface configured to communicate with the first interface via the first protocol and to communicate with the airborne vehicle via a second protocol; and
an emulator configured to convert at least one of a communication of the first protocol received from the second interface into a communication of the second protocol, and a communication of the second protocol received from the airborne vehicle into a communication of the first protocol.

2. The apparatus of claim 1, wherein:
the airborne vehicle is a first airborne vehicle of a first type;
the apparatus comprises a control unit configured to communicate with the second interface and an operator of the apparatus via the first protocol; and
the control unit includes the first interface and a display.

3. The apparatus of claim 2, wherein the first interface comprises:
a receiving unit configured to receive first configuration information of the first airborne vehicle via the first protocol; and
an output unit configured to output the received first configuration information to at least one of the second interface and the display via the first protocol.

4. The apparatus of claim 3, wherein:
the apparatus is at least one of an aircraft, a land-based vehicle and a naval-based vehicle;
the first configuration information of the first protocol includes instructions and parameters for operating the first airborne vehicle; and
the receiving unit is configured to receive the first configuration information from the operator of the apparatus via the first protocol.

5. The apparatus of claim 3, wherein:
the receiving unit is configured to receive at least one of a power on/off instruction, a test instruction, a coordinates instruction and a launch instruction as the first configuration information of the first airborne vehicle via the first protocol from the operator of the apparatus; and
the output unit is configured to output the received first configuration information of the first airborne vehicle to the second interface via the first protocol.

6. The apparatus of claim 3, wherein:
the receiving unit comprises an input unit configured to be operated by the operator of the apparatus to input the first configuration information of the first airborne vehicle via the first protocol; and
the first configuration information of the first protocol includes instructions and parameters for operating the first airborne vehicle.

7. The apparatus of claim 3, wherein:
the first holding device is configured to hold a plurality of the first airborne vehicles; and
the receiving unit is configured to receive, as the first configuration information of at least one of the first airborne vehicles, initialization instructions of the at least one first airborne vehicle from the second interface via the first protocol, and a remaining number instruction indicating a remaining number of the plurality of first airborne vehicles available in the first holding device from the second interface via the first protocol.

8. The apparatus of claim 7, wherein the initialization instructions include a designation of whether one of the plurality of first airborne vehicles is presently configured to be launched from the first holding device.

9. The apparatus of claim 7, wherein the receiving unit is configured to at least one of
automatically receive the remaining number instruction from the second interface upon one of the plurality of first airborne vehicles being launched from the first holding device, and
receive the remaining number instruction in response to a request from the operator of the apparatus.

10. The apparatus of claim 7, wherein:
the output unit is configured to output the first configuration information received by the receiving unit to the display via the first protocol; and
the display is configured to display the first configuration information of the at least one first airborne vehicle via the first protocol.

11. The apparatus of claim 3, wherein:
the second interface is configured to output the first configuration information of the first airborne vehicle received from the output unit to the emulator via the first protocol; and
the emulator is configured to convert the received first configuration information of the first protocol into configuration information of the second protocol for operating the first airborne vehicle.

12. The apparatus of claim 11, wherein the emulator is configured to communicate with the first airborne vehicle via the second protocol, and to output the converted configuration information of the second protocol to the first airborne vehicle to operate the first airborne vehicle.

13. The apparatus of claim 11, wherein:
the first airborne vehicle is configured to output the configuration information of the second protocol to the emulator;
the emulator is configured to convert the configuration information of the second protocol received from the first airborne vehicle into the first configuration information of the first protocol, and to output the converted first configuration information of the first protocol to the second interface via the first protocol; and
the second interface is configured to output the received converted first configuration information of the first protocol to the receiving unit of the first interface.

14. The apparatus of claim 11, wherein:
the emulator is configured to communicate with a launcher;
the launcher is configured to hold and launch the first airborne vehicle, which operates in accordance with configuration information of the second protocol, a second airborne vehicle of a second type, which operates in accordance with configuration information of the first protocol, and a third airborne vehicle of a third type, which operates in accordance with configuration information of a third protocol;

the emulator is configured to receive the configuration information of the first protocol from the interface;

the configuration information of the first protocol includes parameters and instructions for operating the first airborne vehicle, the second airborne vehicle, and the third airborne vehicle; and the emulator is configured to convert the received configuration information of the first protocol into the configuration information of the second protocol for operating the first airborne vehicle, and to convert the received configuration information of the first protocol into the configuration information of the third protocol for operating the third airborne vehicle.

15. The apparatus of claim 2, comprising:

a second holding device configured to hold a second airborne vehicle of a second type, which operates in accordance with a communication of the first protocol, wherein the first interface is configured to communicate with the first holding device and the second holding device via the first protocol.

16. The apparatus of claim 15, wherein the first airborne vehicle is a laser guided rocket, and the second airborne vehicle is a guided missile.

17. The apparatus of claim 16, wherein:

the first holding device is a canister configured to hold the laser guided rocket, and to launch the laser guided rocket via the second protocol; and the second holding device is a canister configured to hold the guided missile, and to launch the guided missile via the first protocol.

18. The apparatus of claim 15, comprising:

a platform configured to mount the first holding device and the second holding device to the apparatus, wherein:

the platform includes a launcher configured to launch the second airborne vehicle held in the second holding device; and the first holding device is adaptively structured to be mounted to the launcher to enable the launcher to launch the first airborne vehicle.

19. The apparatus of claim 18, wherein:

the apparatus is an aircraft including a wing; and the platform is configured to mount the first holding device and the second holding device to the wing of the aircraft.

20. The apparatus of claim 15, wherein the first interface comprises:

a receiving unit configured to receive first configuration information of the first airborne vehicle via the first protocol, and to receive second configuration information of the second airborne vehicle via the first protocol; and an output unit configured to output the received first configuration information to the second interface via the first protocol to operate the first airborne vehicle, and to output the received second configuration information to the second holding device via the first protocol to operate the second airborne vehicle.

21. The apparatus of claim 20, wherein the first configuration information of the first protocol includes instructions and parameters for operating the first airborne vehicle, and the second configuration information of the first protocol includes instructions and parameters for operating the second airborne vehicle.

22. An emulator comprising:

a receiving unit configured to receive a first communication of a first protocol for operating an airborne vehicle, which operates in accordance with a communication of a second protocol, and to receive a second communication of the second protocol from the airborne vehicle;

a conversion unit configured to convert at least one of the received first communication of the first protocol into the second communication of the second protocol, and the received second communication of the second protocol into the first communication of the first protocol; and an output unit configured to output at least one of the converted second communication of the second protocol to the airborne vehicle for operating the airborne vehicle, and the converted first communication of the first protocol to an interface enabling an operator to control an operation of the airborne vehicle.

23. An airborne vehicle holding device for holding and launching a first airborne vehicle of a first type, the airborne vehicle holding device comprising:

a first interface configured to communicate with a second interface via a first protocol to receive from the second interface a communication of the first protocol for operating the first airborne vehicle, which operates in accordance with a communication of a second protocol;

a canister configured to hold the first airborne vehicle, the canister being adaptively structured to be mounted to a launcher configured to launch a second airborne vehicle of a second type; and an emulator configured to convert at least one of the received communication of the first protocol into a communication of the second protocol for operating the first airborne vehicle via the second protocol, and a communication of the second protocol received from the first airborne vehicle into a communication of the first protocol to be outputted to the second interface via the first protocol.

24. A weapons system comprising:

first communication means for communicating via a first protocol;

first holding means for holding an airborne vehicle;

second communication means for communicating with the first communication means via the first protocol, and communicating with the airborne vehicle via a second protocol; and conversion means for converting at least one of a communication of the first protocol received from the second communication means into a communication of the second protocol, and a communication of the second protocol received from the airborne vehicle into a communication of the first protocol.

25. A method for emulating an airborne vehicle, the method comprising:

transmitting a communication of a first protocol from a first interface to a second interface of a holding device holding an airborne vehicle, which operates in accordance with a communication of a second protocol;

converting the communication of the first protocol transmitted to the second interface of the holding device into a communication of the second protocol; and transmitting the converted communication of the second protocol to the airborne vehicle to operate the airborne vehicle.

* * * * *